United States Patent [19]
Lösel

[11] Patent Number: 5,627,491
[45] Date of Patent: May 6, 1997

[54] PLURAL STAGE CIRCUIT WITH AUTOMATIC ADAPTATION TO FIRST AND SECOND VOLTAGE RANGES OF A COMMON VOLTAGE SOURCE

[75] Inventor: Walter Lösel, Fürth, Germany

[73] Assignee: U.S. Philips Corporation, New York, N.Y.

[21] Appl. No.: 504,815

[22] Filed: Jul. 20, 1995

[30] Foreign Application Priority Data

Jul. 27, 1994 [DE] Germany ............... 44 26 511.5

[51] Int. Cl.$^6$ ..................................... G05F 1/10
[52] U.S. Cl. ................. 327/530; 327/538; 327/540
[58] Field of Search .................... 327/530, 538, 327/540, 541, 543, 547

[56] References Cited

U.S. PATENT DOCUMENTS

| | | | |
|---|---|---|---|
| 5,006,728 | 4/1991 | Yonekura et al. | 327/530 |
| 5,315,165 | 5/1994 | Takiguchi et al. | 327/530 |

Primary Examiner—Timothy P. Callahan
Assistant Examiner—T. Lam
Attorney, Agent, or Firm—Bernard Franzblau

[57] ABSTRACT

A circuit arrangement which comprises at least one stage which is to be fed by a source voltage from a common voltage source, at least one of these stages comprising a control signal generating circuit which can apply a control signal, to be derived from the source voltage, to a control signal output bus conductor which is common to all stages. A control signal input bus conductor can be connected to the control signal output bus conductor via a central bridge when the source voltage has a value within a first value range and which can be isolated from the control signal output bus conductor by the central bridge when the source voltage has a value within a second value range. Each stage includes a respective control circuit which can be connected to the control signal input bus conductor in order to receive the control signal and which can adjust the stage to a source voltage from the associated value range by application or interruption of the control signal. Thus, the circuit arrangement simply adapts the stages fed by the voltage source to the particular source voltage.

15 Claims, 1 Drawing Sheet

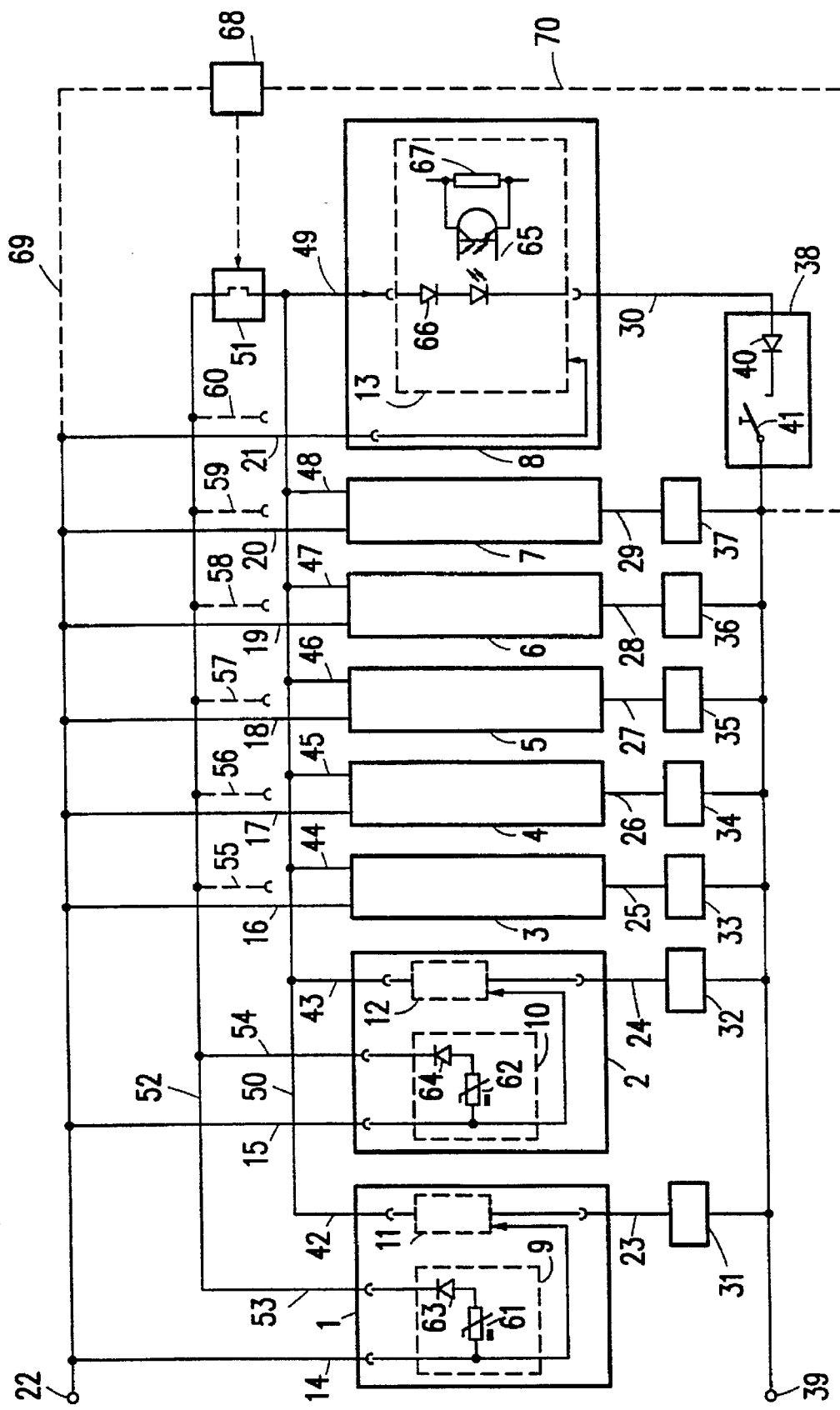

PLURAL STAGE CIRCUIT WITH AUTOMATIC ADAPTATION TO FIRST AND SECOND VOLTAGE RANGES OF A COMMON VOLTAGE SOURCE

BACKGROUND OF THE INVENTION

This invention relates to a circuit arrangement which comprises least one stage which is to be fed by a source voltage from a common voltage source.

Circuit arrangements of this kind are used, for example, in telecommunication systems, to supply a system of usually several telecommunication devices with electric energy from a common voltage source, for example, a central battery of a telecommunication centre or an emergency power supply. Central batteries of this kind supply source voltages having essentially two different nominal values, i.e. 48 volts and 60 volts. When a circuit arrangement of the kind set forth is used in conjunction with a given central battery or the like, all stages to be fed with electric energy therefrom must be adapted to the nominal value of the source voltage. This may necessitate undesirably intricate adjusting operations during installation as well during operation.

SUMMARY OF THE INVENTION

It is an object of the invention to provide a circuit arrangement in which the stages fed by the source can be very simply adapted to the source voltage.

In accordance with the invention this object is achieved by means of a circuit arrangement which comprises at least one stage which is to be fed by a source voltage from a common voltage source and in which at least one of these stages comprises a control signal generating circuit which can apply a control signal, to be derived from the source voltage, to a control signal output bus conductor which is common to all stages, a control signal input bus conductor which can be connected to the control signal output bus conductor via a central bridge when the source voltage assumes a value within a first value range and which can be isolated from the control signal output bus conductor by the central bridge when the source voltage assumes a value within a second value range, and in each stage a respective control circuit which can be connected to the control signal input bus conductor in order to apply the control signal and which can adjust the stage to a source voltage from the associated value range by application or interruption of the control signal.

Thus, in the circuit arrangement in accordance with the invention the individual stages are adapted to the relevant source voltage by the central bridge for all stages in common. Depending on the source voltage to be applied, the central bridge may be used in the open or closed state, i.e. in the conductive or blocked state. This is advantageous, for example when a large system comprising many stages is connected to a common voltage source. It is then no longer necessary to adjust all stages intricately to the source voltage supplied, always involving the risk of accidental skipping of individual stages so that they may be damaged when the system is switched on or that they do not operate correctly; instead the system is completely and reliably adjusted to the relevant source voltage by the central bridge. Moreover, for example, for maintenance individual stages of such a system can be simply exchanged without it being necessary to take into account the instantaneous source voltage. To this end, the stages can be used for the various value ranges of the source voltage in conformity with the control signal applied thereto. Thus, it is not necessary to stock differently constructed stages for different source voltages.

The stages comprising a control signal generating circuit can also exert an effect such that when all of these stages are removed from the relevant system, a control signal also reaches the control signal input bus conductor. This case corresponds at least substantially to interruption of the central bridge. Thus, on the one hand adjustment to a given source voltage by the central bridge can take place only in the presence of at least one stage comprising a control signal generating circuit; the adjustment by the central bridge is thus activated by such a stage. On the other hand, a central bridge can also be permanently activated and, without taking additional steps, the adjustment to a given source voltage can be rendered dependent upon whether at least one stage comprising a control signal generating system is activated in the system. By insertion of such a stage one of the two value ranges for the source voltage is automatically selected and preset for all stages. As a result, in one system stages which are suitable for operation with two different source voltages can be used in conjunction with stages which are suitable for only one of the two relevant source voltages. Each of the latter stages is then provided with a control signal generating circuit or not, depending on the value range of the source voltage for which they are constructed. Numerous combinations are thus feasible. Moreover, by using multi-type control signal input or output bus conductors, in conjunction with a multi-pole central bridge, a selection can also be made from more than two value ranges for the source voltage. Such a construction of the central bridge allows for fully automatic adaptation of a system, even during operation, to different source voltages, i.e. source voltages having different nominal values. If necessary, a driver device may comprise a storage device for the switch-over signal, so that once an adjustment has been found for the central bridge it is maintained even in the case of failures or interruptions of the source voltage.

The stages of the circuit arrangement in accordance with the invention preferably constitute power supplies for separate sections of an extensive system or include such power supplies. As has already been stated by way of example, such power supplies may form part of a telecommunication system, in which case, in accordance with the invention, they can be switched as desired between two feasible source voltages of a central battery by the central bridge. Such a central battery may also be replaced by an equivalent emergency power supply or the like. When the central bridge and the conductors to be connected thereto are appropriately constructed, it will also be possible to make a selection from more than two battery voltages or the like.

In its simplest form, the circuit arrangement in accordance with the invention is used for the selectable operation with central batteries having a nominal voltage of either 48 V or 60 V.

In a further version, in at least a part of the stages, at least one source value relating to the value of the source voltage can be switched over by the control signal. Such threshold values can be provided by corresponding devices within each individual stage, for example, for an overvoltage or undervoltage cut-out or an overvoltage or undervoltage alarm. Thresholds of this kind, notably derived by extraction of a reference voltage, can be adapted to the various nominal voltages of the voltage source in accordance with the invention so that they satisfy the requirements for any voltage source to be used. On the one hand the operability of the individual stages and on the other hand that of the voltage source may be of importance for the selection of the threshold values. Notably, the invention avoids the risk of destruction of the stages by overvoltages and the risk of overloading and hence damaging of the voltage source accompanied by an undervoltage. The described source voltage dependent automatic switching over of the central bridge is preferably performed in such a manner that circumvention of the threshold values is precluded.

Further embodiments of the invention are described in the dependent claims.

BRIEF DESCRIPTION OF THE DRAWINGS

The single FIGURE of the drawing shows a circuit in accordance with the invention.

The FIGURE shows an embodiment of the circuit arrangement in accordance with the invention, comprising a total of eight stages 1 to 8, the first stage 1 and the second stage 2 comprising a respective control signal generating circuit 9, 10. All stages 1 to 8 comprise a respective control circuit 11, 12, 13. For the sake of simplicity, however, in the first stage 1 and the second stage 2 only the respective control signal generating circuit 9, 10, is shown explicitly and the control circuit 11, 12 is shown in the form of a block diagram. In the eighth stage 8 the associated control circuit 13 is shown in detail with respect to the parts which are essential to the invention. The third to seventh stages 3 to 7 are constructed like the stage 8. For the sake of simplicity, however, the stages 3 to 7 are shown only in the form of a block diagram. In the present embodiment all stages 1 to 8 constitute power supplies for a telecommunication system.

Each of the stages 1 to 8 comprises a first supply voltage terminal 14 to 21, respectively, said terminals being connected to a first terminal 22 of a common voltage source which is not explicitly shown in the FIGURE. The first terminal 22 corresponds, for example, to the positive pole of the voltage source. Furthermore, the stages 1 to 8 are connected, via a respective second supply voltage terminal 23 to 30 and via a respective safety circuit 31 to 38, to a second terminal 39 of the common voltage source which is preferably the negative pole of the voltage source in the present example. Of all safety circuits 31 to 38, only the safety circuit 38 associated with the eighth stage 8 is explicitly shown. All other safety circuits 31 to 37 are identical to the safety circuit 38 which comprises a series connection of an input voltage decoupler diode 40 and a power supply fuse 41. The input voltage de, coupler diode 40 precludes reverse currents in the stage 8. In the case of overcurrents, the power supply fuse 41 isolates the stage 8 from the terminals 22, 39 of the voltage source. The corresponding functions are implemented by the other safety circuits 31 to 37 for the first to seventh stages 1 to 7.

In addition to the connection of the stages 1 to 8 to the terminals 22, 39 of the voltage source for power supply, the present embodiment of the circuit arrangement also comprises a control signal input 42 to 49 for each stage. All control signal inputs 42 to 49 are connected to a control signal input bus conductor 50. The control signal input bus conductor 50 can be connected to a control signal output bus conductor 52 via a central bridge 51. The first stage 1 and the second stage 2 comprise respective control signal outputs 53, 54 which are each connected to the control signal output bus conductor 52. The other stages, i.e. the third to eighth stages 3 to 8, are not connected to the control signal output bus conductor 52. However, as is denoted by dashed lines in the FIGURE, connections 55 to 60 to the control signal output bus conductor 52 may be provided for these stages. This is advantageous when the stages 1 to 8 are inserted into the overall circuit arrangement so as to be exchangeable, for example plug-connectable, as denoted by the connectors for the stages 1, 2 and 8 in the supply voltage terminals 14, 15, 21 or 23, 24, 30, the control signal inputs 42, 43, 49 as well as the control signal outputs 53, 54. Evidently, the same holds for the construction of the corresponding connections of the other stages 3 to 7 which are not shown in detail. Due to the terminals 55 to 60 provided for each connection location for each of the stages, stages like the first and the second stage 1, 2 which include a control signal generating circuit 9 or 10 can be inserted also at the location of any other stage 1 to 8, so that the associated terminals 55 to 60 take over the function of a control signal output corresponding to the control signal outputs 53, 54. The stages 1, 2, comprising a control signal generating circuit 9, 10, are also referred to as "central stages". The stages 1 to 8 in a special embodiment constitute power supplies for parts or modules of a complete telecommunication system. In that case the stages 1, 2 are referred to as "central power supplies".

Each of the control signal generating circuits 9, 10 in the present example comprises a PTC element 61, 62, preferably a PTC resistor, which is connected in series with a rectifier element 63, 64, respectively. Each of these series connections 61, 63 and 62, 64 is arranged between the first supply voltage terminal 14, 15 of the associated stage 1, 2 and the control signal output 53, 54, so that the associated control signal can be derived, via these series connections, from the source voltage on the first terminal 22 of the voltage source. The PTC elements are proportioned so that they limit the current which flows in the control signal output bus conductor 52 and which forms a control signal of a value required to apply the control signal to all control signal inputs 42 to 49. The rectifier elements 63, 64 are also intended to decouple the control signal generating circuits 9, 10 from one another. One "central stage", i.e. one control signal generating circuit 9 or 10, in principle suffices to generate the control signal. For reasons of redundancy two control signal generating circuits 9, 10 are used in the described embodiment. In the case of a failure of one of the control signal generating circuits 9, 10, the overall circuit arrangement then remains operational.

The construction of the control circuits of the individual stages will be described by way of example with reference to the control circuit 13 of the eighth stage. This control circuit 13 comprises a series connection of the input circuit of an optocoupler 65 and a constant current diode 66, which series connection is arranged between the control signal input 49 and the second supply voltage terminal 30. When the control signal from the control signal output bus conductor 52 is applied via the central bridge 51, a given current flows through this series connection of the constant current diode 66 and the input circuit of the optocoupler 65, which current triggers a switching operation via the output circuit of the optocoupler 65. The present embodiment comprises a resistor 67 which can be bridged by the output circuit of the optocoupler 65. The optocoupler 65 can thus switch this resistor, and switching devices connected thereto, to a potential which is free from the control signal. The constant current diode 66 is proportioned in relation to the input circuit of the optocoupler 65 and the PTC element (elements) 61, 62. Thus, on the one hand predetermined currents act as the control signal. On the other hand, the PTC element (elements) 61, 62 takes over (take over) the function of an overcurrent protection in the case of faults in the circuit arrangement.

Via the optocoupler 65 the control circuit 13 (or the corresponding control circuits 11, 12 etc. for the other stages) can perform mainly the switching over of the stages 1 to 8 to different source voltages and also to different threshold values related to these source voltages. Preferably, a power supply comprising a stage 1, 2, ... or 8 is provided with a device for overvoltage and/or undervoltage cut-out which is not shown in the FIGURE. These devices interrupt the supply of energy via the supply voltage terminals 14, 15, ... 21 when the source voltage present across the terminals 22, 39 exceeds or drops below a nominal value by a given percentage. Moreover, there may be provided further threshold values with preferably smaller percentages of deviation from the nominal value so as to trigger an overvoltage or undervoltage alarm prior to the switching off. These threshold values must be changed together with the switching over of the nominal values of the source voltages which is also referred to as the switching over between different value ranges of the source voltage. Preferably this is also realised by the optocoupler 65 (and corresponding further optocouplers in the other stages 1 to 7).

In the simplest case the central bridge 51 is constructed as a conductor connection which can be manually plugged in or activated. As a result, the entire circuit arrangement, including all of the stages 1 to 8, can be constructed irrespective of the value range in which the relevant source voltage to be applied to the terminals 22, 39 is to appear, i.e. irrespective of the type of voltage source used to operate the entire system at a later stage. Prior to the first putting into operation, in conformity with the source voltage present or selected, the central bridge is then inserted or interrupted or omitted, so that the entire system is directly suitable for connection to the relevant source voltage without further steps being necessary. This simplifies the construction and the putting into operation of such a system and also its expansion, maintenance and service, notably also when individual stages 1 to 8 are exchanged.

Dashed lines in the FIGURE additionally indicate an embodiment in which the central bridge 51 is constructed so as to include a switching device for isolating or connecting the control signal input bus conductor 50, as desired, from and to the control signal output bus conductor 52, and also a driver device 68 which can receive the source voltage from the terminals 22, 39 via two conductors 69, 70. The driver device 68 generates a switch-over signal which is applied to the central bridge 51 or to the switching device constituting this bridge. The central bridge 51 is rendered conductive or blocked, in conformity with this switch-over signal. The switch-over signal is formed in the driver device 68 in conformity with a comparison as to within which value range the value of the source voltage is situated. Automatic switching over to the instantaneously applied source voltage can thus take place and the entire system can be adjusted to this source voltage.

However, in this respect it is to be noted that switching over to, for example, a lower nominal value of the source voltage cannot take place automatically if the instantaneous source voltage assumes an excessively low value because of a fault, which excessively low value is in the value range around said lower nominal value. This can be prevented by providing the driver device 68 with a storage device in which a comparison result is stored at an instant at which the source voltage is applied without fault.

The described circuit arrangement can be simply extended in various ways. For example, the number of stages 1 to 8 can be changed without modifying the device and without additional steps being necessary; both more and fewer stages can be used. On the other hand, there may also be more than two permitted value ranges for the source voltage. Preferably, the control signal input bus conductor 50, the central bridge 51, the control signal output bus conductor 52 as well as all terminals, inputs and outputs connected thereto are then constructed so as to be of a multi-wire type. By selectable combination of connection or isolation of these wires by the (multi-wire) central bridge 51, control signals with more than two signal values can then also be transmitted. In a simplified embodiment of such a system the control signal generating circuits 9, 10 and the control signal output bus conductor 52 may even remain unchanged. Merely the central bridge 51 and the control signal input bus conductor 50 and the terminals connected thereto are then constructed so as to be of a multi-wire type.

I claim:

1. A circuit arrangement comprising: at least one stage which is to be fed by a source voltage which can have a value within a first or second value range from a common voltage source at least one of said stages comprising a control signal generating circuit which can apply a control signal, to be derived from the source voltage, to a control signal output bus conductor which is common to all of said stages, a control signal input bus conductor which can be connected to the control signal output bus conductor via a central bridge when the source voltage has a value within the first value range and which can be isolated from the control signal output bus conductor by the central bridge when the source voltage has a value within the second value range, each stage comprising a respective control circuit connected to the control signal input bus conductor in order to adjust the associated stage to a source voltage from the first or second value range by application or interruption of the control signal.

2. A circuit arrangement as claimed in claim 1, wherein the central bridge comprises a switching device for isolating or connecting, as desired, the control signal input bus conductor from or to the control signal output bus conductor, and further comprising a driver device coupled to the common voltage source in order to generate a switch-over signal, to be applied to the switching device, and determined by the value range of the source voltage.

3. A circuit arrangement as claimed in claim 1, wherein the stages constitute power supplies.

4. A circuit arrangement as claimed in claim 3, wherein the power supplies are included in a telecommunication system and the common voltage source can have first or second values, and the central bridge performs switching over, as desired, as a function of the value of the common voltage source.

5. A circuit arrangement as claimed in claim 1 wherein in at least a part of the stages at least one threshold value related to the value of the source voltage can be switched over by the control signal.

6. A circuit arrangement as claimed in claim 1 wherein the control signal generating circuits comprise a respective series connection of a positive temperature coefficient (PTC) element and a rectifier element via which the control signal can be derived from the source voltage.

7. A circuit arrangement as claimed claim 1 wherein each control circuit comprises a series connection of an input circuit of an optocoupler and a constant current diode, which series connection is connected between the control signal input bus conductor (50) and a terminal of the common voltage source.

8. A power supply circuit comprising:
   first and second input terminals for connection to a common source of voltage that can supply voltages within a first or second voltage value range,
   a control signal input bus conductor,
   a control signal output bus conductor, a plurality of circuit stages each having a control circuit coupled to said control signal input bus conductor, at least one of said circuit stages including a control signal generating circuit coupled to said first input terminal for deriving a control signal from the common source voltage and applying said control signal to the control signal output bus conductor, a central bridge for selectively coupling and uncoupling said control signal input bus conductor and said control signal output bus conductor dependent on the voltage value range of the common source voltage, and wherein each control circuit is responsive to the control signal on the control signal input bus conductor to adjust its respective circuit stage to the voltage value range of the common voltage source connected to the first and second input terminals.

9. The power supply circuit as claimed in claim 8 wherein the central bridge couples the control signal output bus conductor to the control signal input bus conductor when the common source voltage is within the first voltage value range and uncouples the control signal output bus conductor from the control signal input bus conductor when the common source voltage is within the second voltage value range, whereby the control circuits in respective circuit stages adjust the respective circuit stages for operation in the first or second voltage value range, respectively.

10. The power supply circuit as claimed in claim 8 wherein the central bridge comprises a switching device for coupling and uncoupling the control signal input bus conductor and the control signal output bus conductor, and means coupled to the first input terminal and the switching device for generating a switching signal for the switching device which is determined by the voltage value range of the common source of voltage connected to the first and second input terminals.

11. The power supply circuit as claimed in claim 8 wherein two of said circuit stages include a respective control signal generating circuit.

12. The power supply circuit as claimed in claim 8 wherein the control signal generating circuit comprises a series circuit including a positive temperature coefficient element and a rectifier element coupled to the first input terminal and to the control signal output bus conductor whereby the control signal is derived from the voltage of the common source of voltage connected to the input terminals.

13. The power supply circuit as claimed in claim 12 wherein at least one control circuit comprises a series circuit including a diode and the input circuit of an optocoupler, said series circuit being connected between the control signal input bus conductor and the second input terminal.

14. The power supply circuit as claimed in claim 8 wherein at least one control circuit comprises a series circuit including a diode and the input circuit of an optocoupler, said series circuit being connected between the control signal input bus conductor and the second input terminal.

15. The power supply circuit as claimed in claim 8 wherein each control circuit includes an optocoupler coupled to the control signal input bus conductor and to the second input terminal for adjusting its respective circuit stage for operation with a voltage source providing voltages in said first or second voltage value ranges and as a function of the control signal on the control signal output bus conductor.

* * * * *